United States Patent Office 3,249,422
Patented May 3, 1966

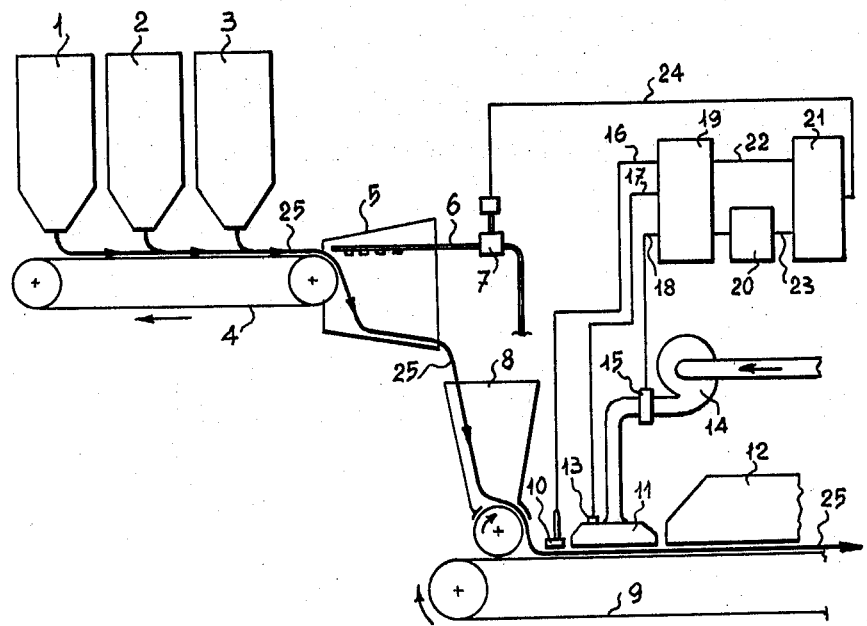

3,249,422
METHOD FOR PROPORTIONING THE HUMIDIFYING WATER IN A FINELY DIVIDED MOISTENED MIXTURE UNDERGOING AGGLOMERATION ON A CONTINUOUS GRATE, IN ORDER TO OBTAIN ITS BEST PERMEABILITY, AND AN APPARATUS TO EMBODY SAID METHOD
Giovanni Sironi, Genoa, Vittorio Testoni, Genoa-Pegli, and Antonio Montessoro, Gianfranco Pareto, and Giovanni Vanni, Genoa, Italy, assignors to Societa Finanziaria Siderurgica "Finsider" per Azioni Istituto Siderurgico, Genoa-Cornigliano, Italy
Filed May 15, 1962, Ser. No. 194,779
Claims priority, application Italy, July 29, 1961, 659,179
9 Claims. (Cl. 75—5)

An important object of the present invention is to control and adjust the amount of humidifying water added to a finely divided mixture undergoing agglomeration on a continuous grate, particularly for pulverulent minerals to be fed into furnaces in order to obtain the best permeability of the mixture.

Methods for agglomeration on a continuous grate, particularly for pulverulent minerals to be fed into furnaces are well known. In such methods, the mixtures of the materials to be treated after being mixed with a solid fuel (coke, various coals or the like) and suitably prepared, are ignited on the surface. Due to air suction on the whole surface of the belt on which they are arranged, after ignition the combustion front proceeds inwardly with respect to the ignited surface as long as the loaded mixture is completely affected by combustion.

The better the permeability of the mixture on the belt before ignition, the lower is the speed of the combustion front and the higher is the output of the belt.

The permeability of a given dry mixture may be improved by gradual additions of water up to a certain degree, above which the permeability thereof decreases.

Therefore, there is for each mixture of material a definite degree of humidity at which the best permeability is obtained and when all the other conditions remain unchanged, the highest efficiency from the plant results when the mixture is maintained at this optimum humidity.

In the plants existing at present, the humidification of the mixture is commonly left to an operator who operates according to a personal slight judgement; however, when carrying out the humidification in this way there is no guaranty that the resulting mixture is the one having the best permeability.

The present invention has for its object a method and corresponding apparatus suitable to remove the above disadvantage.

The method for proportioning the humidifying water in a finely divided moistened mixture undergoing agglomeration by ignition on a continuous grate comprises the steps of humidifying the mixture; measuring the permeability to the passage of air before ignition of a portion of said mixture as it passes a certain point and storing said measurement; similarly measuring permeability of a subsequent portion of the said mixture at the said point; comparing the two permeability measurements; and varying the degree to which said mixture is humidified if said permeability measurements differ.

The figure is a flow diagram illustrating a plant in which the method of this invention has been incorporated.

The method for proportioning the humidifying water in a finely divided moistened mixture undergoing agglomeration on a continuous grate by ignition, comprises also the steps of humidifying the mixture; measuring the permeability to the passage of air before ignition of a portion of said mixture as it passes a certain point and storing said measurement; increasing the humidifying water by a predetermined small proportion; similarly measuring permeability of a subsequent portion at the said point; comparing the two permeability measurements; and varying the proportion of humidifying water added in the same direction as any change in permeability.

The method for proportioning the humidifying water in a finely divided moistened mixture undergoing agglomeration by ignition on a continuous grate also comprises the steps of humidifying the mixture; measuring the permeability to the passage of air before ignition of a portion of said mixture as it passes a certain point and storing said measurement; decreasing the humidifying water by a predetermined small proportion; similarly measuring permeability of a subsequent portion at the said point; comparing the two permeability measurements; and varying the proportion of humidifying water added in the opposite direction to any change in permeability.

The method for proportioning the humidifying water in a finely divided moistened mixture undergoing agglomeration by ignition on a continuous grate is further characterized in that the permeability of any mixture is measured before ignition with respect to the passage of a flux of air, the amount of water added to the mixture is then varied, by increasing or decreasing it, as long as the permeability is different from that of the immediately preceding measurement, and then the proportion of water is increased or decreased, so that the resulting permeability is adjusted within a very short interval to its optimum degree.

The apparatus for proportioning the humidifying water in a finely divided mixture undergoing agglomeration by ignition on a continuous grate comprises means for passing air through the unignited mixture and grate, means for measuring permeability to air of the unignited mixture on the grate as a function of thickness of the mixture layer, volume of air passing and pressure difference of air passing, means to store the permeability measurement, and means to compare said stored permeability measurement with a subsequent permeability measurement and to adjust the proportion of humidifying water, by acting on the servomotor of the adjusting valve.

The apparatus for proportioning the humidifying water in a finely divided moistened mixture undergoing agglomeration by ignition on a continuous grate is also characterized in that the comparing means are provided with the starting degree of permeability of the mixture and with a subsequent permeability degree measured after a controlled variation, which may be either positive or negative of desired amount of humidifying water, in such a way that if the difference resulting from the second and the first permeability measurement is equal to or very close to zero, the remaining portion of said comparing means keeps the delivery of water to the servo-controlled valve unchanged. On the contrary, if the difference results in a positive value for a positive increase, or a negative value for a negative increase, the remaining portion of said comparing means acts on the servomotor of the above valve, increasing the passage of water through it, while if the difference results in a negative value for a positive increase, or a positive value for a negative increase, the above comparing means acts on the servomotor of the said valve reducing the passage of water through the valve, so as to maintain the permeability of the mixture constantly at its optimum degree.

The method for proportioning the humidifying water in a finely divided moistened mixture undergoing agglomeration by ignition on a continuous grate comprises the steps of humidifying the mixture; measuring the permeability to the passage of air before ignition of two portions of said mixture having different amount of humidity and spaced apart on the grate; comparing the two permeability measurements; and varying the amount of water which is fed to said mixture if said permeability measurements, effected on different zones of the layers of mixtures passing the same measurement area of the installation, at successive times differ.

The method for proportioning the humidifying water in a finely divided moistened mixture undergoing agglomeration by ignition on a continuous rate comprises the further steps of adding a separate known small amount of water before the downstream permeability measurement and after the upstream permeability measurement; and varying the humidifying water added in the same direction as any change in permeability.

The method for proportioning the humidifying water in a finely divided moistened mixture undergoing agglomeration by ignition on a continuous grate, comprises the steps of humidifying the mixture; measuring the permeability to the passage of air before ignition of two portions of the mixture upon the grate; comparing the two permeability measurements; and varying the proportion of humidifying water if the permeability measurements differ.

The accompanying drawing illustrates, only by way of example, in a diagrammatic manner an embodiment of the apparatus according to the present invention.

Referring particularly to the figure, the stores 1 and 2 contain the finely divided raw materials; 3 is the container of the powdered solid fuel, 4 is the belt conveying the material into the mixer 5, within which operates the humidifying device 6 controlled by the servomotor valve 7; 8 is a hopper leading the mixture on the continuous grate 9; the measurer transducer device 10 measures the thickness of the mixture belt and send it by way of lead 16 to the computer 19; 11 is a hood, arranged just before a hood 12, for the ignition of the mixture and carrying applied thereon the pressure sensor transducing device 13 which measures the difference in pressure of the air fed through the fan conduit 14 to the mixture layer and the air pressure on the opposite surface of the mixture exposed to atmospheric air and transmits it by way of lead 17 to the computer 19; 15 is a differential pressure sensing and transmitting device which measures the volume of air passing through a constant passage section in the duct from the blower 14 to the hood 11 and transmits it by way of lead 18 to the computer 19. The computer calculates the value of the permeability from the individual quantities being sensed and sends it to an electronic memory 20 where the measurements are stored and transmitted on request to the computer 21 for comparison of the respective permeability degrees; the electronic comparison computer 21 cooperates through the connections 22 and 23 with the device 19, or 20 respectively; the conducting line 24 transfers the output of device 21 to the reference of the servo-controlled valve 7; 25 is the course followed by the mixture.

The operation of the apparatus is the following:

The desired amounts of material are fed from the corresponding containers 1 to 3 to the belt 4, said material is then led into the mixer 5 where is added thereto a proportion of water more or less corresponding to the value necessary to obtain the optimum degree of permeability of the mixture. From the mixer 5 the mixture passes on to the hopper 8 from where it is discharged in a sufficiently constant amount on the continuous grate 9.

The process of agglomeration of the mixture takes place on said grate.

In order to obtain a high efficiency for the above process it is necessary, as previously stated, to obtain, the best permeability.

The permeability of the mixture is calculated by the device 19, by solving the following equation:

$$P = \frac{V}{A}\left(\frac{h}{\Delta p}\right)^n$$

where:

P—is the permeability degree to be found
V—is the amount of air forced through the hood 11 and measured at 15
A—is the constant area of the agglomerate through which the volume of air V passes and A depends on the size of hood 11
h—is the mixture thickness measured at 10
$\Delta p$—is the difference in pressure of the air undergoing passage through the mixture layer and atomspheric air, measured at 13
n—is a known constant value equal to 1.0 if the flow is streamlined, and 0.5 if the flow is fully turbulent. Although n varies slightly with the type of raw material, a reasonable value for n is 0.60 as determined by Voice et al. (Symposium on Sinter, Special Report No. 53—The Iron and Steel Institute, 4 Grosvenor Gardens, London S.W.1, March 1955).

The permeability degree being so obtained, the device 19 stores it at 20.

The water coming out of the humidifying device 6 is then increased by a given proportion, and after a certain period of time, corresponding to the period of time it takes for the more humid portion of mixture to arrive under the hood 11, all the operations are repeated to obtain the new permeability degree P1.

When the device 19 has given the new degree P1, it is forwarded through the connection 22 to the device 21 to which is simultaneously sent by the device 20 through the connection 23 the degree P of the previous permeability.

The device 21 deducts degree P from degree P1.

If the difference is equal to zero or very close to it, it means that the said degree is very close to the optimum value.

In such a case the device 21 keeps the opening of the servo-controlled valve 7 constant.

If the difference is a positive value, it means that the precedent proportion of water was smaller than the one giving the optimum permeability, therefore the device 21 acts on the servomotor of valve 7 so as to increase the proportion of water coming out of the humidifying device 6. By successive cycles of the same type, it is possible to reach the percent of total humidity of the mixture giving the optimum permeability.

On the contrary, if the difference is a negative value, it means that the precedent amount of water was above the optimum value, therefore in an analogous way the proportion of water coming out of the humidifying device is reduced until reaching the optimum degree of permeability.

In such a way the best degree of permeability may be obtained automatically, with any type of mixture having any undefined starting degree of humidity.

The controls are repeated so that when owing to whatsoever external cause, as a variation in the mixture delivery, variation in the starting humidity of at least one of the components, or the like, the degree of permeability results vary by an amount higher than the tolerance of the devices, the controls vary the amount of water fed to the humidifying device 6 according to the above mentioned method, until the optimum conditions are established again.

While we have indicated and described the nature of the present invention and the manner in which it is to be performed, it will be apparent that the present invention is by no means limited to what has been particularly shown and described, but that many modifications may be made without departing from the scope of the invention.

What we claim is:

1. A method for proportioning the humidifying water in a finely divided moistened mixture undergoing agglomeration by ignition on a continuous grate, comprising the steps of: humidifying the mixture; measuring the permeability to the passage of air before ignition of a portion of said mixture as it passes a certain point, storing said measurement; varying in a first direction the degree of humidification of a subsequent portion of said mixture; measuring permeability of a subsequent portion of the mixture at the said point; comparing the two permeability measurements; and varying the degree to which said mixture is humidified if said permeability measurements differ, in the same manner as said first direction if said permeability comparison shows that said subsequent portion has the greater permeability and in the opposite manner as said first direction if said permeability comparison shows said subsequent portion to have the lesser permeability.

2. A method for proportioning the humidifying water in a finely divided moistened mixture undergoing agglomeration by ignition on a continuous grate comprising the steps of: humidifying the mixture; measuring the permeability to the passage of air before ignition of a portion of said mixture as it passes a certain point, storing said measurement; increasing the humidifying water by a known small proportion; similarly measuring permeability of a subsequent portion at the said point; comparing the two permeability measurements; and varying the proportion of humidifying water added in the same direction as any change in permeability.

3. A method for proportioning humidifying water in a finely divided moistened mixture undergoing agglomeration by ignition on a continuous grate comprising the steps of: humidifying the mixture; measuring the permeability to the passage of air before ignition of a portion of said mixture as it passes a certain point storing said measurement; decreasing the humidifying water by a known small proportion; similarly measuring permeability of a subsequent portion at the same point; comparing the two permeability measurements; and varying the proportion of humidifying water added in the opposite direction to any change in permeability.

4. A method of automatic humidification for obtaining the optimum permeability of a finely divided moistened mixture undergoing agglomeration by ignition on a continuous grate, which comprises humidifying said mixture, automatically determining the permeability of said mixture on the grate to the passage of air before ignition, automatically storing said permeability determination, automatically varying the degree of humidification of said mixture in a first direction, automatically determining the permeability of said mixture having a varied degree of humidification, automatically comparing the permeability determinations, and automatically varying the degree of humidification of said mixture according to the comparison of said determined permeabilities to obtain the optimum permeability of said mixture, said humidification degree being varied in the same manner as said first direction if said permeability of said mixture having a varied degree of humidification shows an increase and in the opposite manner as said first direction if said permeability of said mixture having a varied degree of humidification shows a decrease.

5. An apparatus for automatically proportioning humidifying water in a finely divided moistened mixture undergoing agglomeration by previous ignition successive suction on a continuous grate which comprises a conduit having means for passing air through said unignited mixture on the grate, means associated with said conduit for measuring the volume of air passing through said mixture, means mounted on said conduit defining the area of mixture through which said air is passing, air pressure measuring means associated with said conduit, means for sensing the thickness of said mixture on the grate, means for determining the permeability of said mixture on the grate connected with and receiving information from said air pressure measuring means, said air volume measuring means, and said thickness sensing means, said permeability being determined as a function of the area of said mixture through which air is passing, said volume of air, said thickness of said material and the difference in pressure of air passing through said mixture and atmospheric air, means for storing a permeability determination, means for comparing a stored permeability with a subsequent permeability determination connected with and receiving information from said storing means and said permeability determination means, and humidifying means having a servomotor adjustable valve activated by said comparing means, whereby the permeability of the mixture is determined automatically and compared automatically with a subsequent automatic permeability determination, and said comparing means activates the servovalve of said humidifying means so that the amount of humidity added to the mixture on the grate is varied automatically to obtain a mixture having optimum permeability.

6. A method of automatic humidification for obtaining the optimum permeability of a finely divided moistened mixture undergoing agglomeration by ignition on a continuous grate, which comprises humidifying a first portion of said mixture, varying the degree of humidification of a second portion of said mixture, determining the permeability to the passage of air before ignition of said portions of mixture spaced apart on a grate, comparing said permeability determinations, and varying the degree to which said mixture is humidified in the direction of the degree of humidification of the portion showing the highest permeability.

7. A method according to claim 4 and in addition the steps of determining the new permeability of said material on the grate before ignition after varying the degree of humidification of said mixture so as to obtain a mixture having an optimum permeability, comparing said new permeability with the previously determined optimum permeability, if said comparison indicates a difference in permeability, varying the degree of humidification of said mixture in the direction indicated by said comparison to obtain a mixture having the highest permeability, and repeating said steps until said comparison of permeabilities indicates essentially no difference in said permeability determination.

8. A method according to claim 4 and in addition, repeating at intervals the steps of automatically storing the optimum permeability determination, automatically determining the permeability of said mixture on the grate to the passage of air before ignition, automatically comparing said permeability determination with said optimum permeability determination, and if said comparison indicates a difference in permeability, automatically varying said degree of humidification according to the degree of humidification of the optimum permeability as shown by said automatic permeability comparison so that the optimum permeability of said mixture is maintained.

9. An apparatus for automatically proportioning humidifying water in a finely divided moistened mixture undergoing agglomeration by previous ignition on a continuous grate which comprises a conduit having means for passing air through said unignited mixture on the grate, means associated with said conduit for measuring the volume of air passing through said mixture, means mounted on said conduit defining the area of mixture through which said air is passing, air pressure measuring means associated with said conduit, means for sensing the thickness of said mixture on the grate, a calculating device for determining the permeability of said mixture on the grate connected with and receiving information from said air pressure measuring means, said air volume measuring means, and said thickness sensing means, said permeability being determined by the formula, $$\frac{V}{A}\left(\frac{h}{\Delta p}\right)^n$$

where V is the volume of air passing through said mixture, A is the area of said mixture through which said air is passing, $h$ is the thickness of said mixture, $\Delta p$ is the difference in pressure of said air undergoing passage through said mixture and atmospheric air, and $n$ is a constant, means for storing a permeability determination, means for comparing a stored permeability with a subsequent permeability determination connected with and receiving information from said storing means and said permeability determination means, and humidifying means having a servomotor adjustable valve activated by said comparing means, whereby the permeability of the mixture is determined automatically and compared automatically with a subsequent automatic permeability determination, and said comparing means activates the servovalve of said humidifying means so that the amount of humidity added to the mixture on the grate is varied automatically to obtain a mixture having optimum permeability.

References Cited by the Examiner

UNITED STATES PATENTS

| | | | |
|---|---|---|---|
| 2,637,212 | 5/1953 | Moore | 73—38 |
| 2,914,395 | 11/1959 | Davies | 266—21 |
| 3,148,971 | 9/1964 | MacDonald | 75—3 |

BENJAMIN HENKIN, *Primary Examiner.*

DAVID L. RECK, *Examiner.*

R. W. GASS, *Assistant Examiner.*